(12) United States Patent
Hirabayashi et al.

(10) Patent No.: US 7,823,475 B2
(45) Date of Patent: Nov. 2, 2010

(54) SEALED WORM GEAR TYPE FINGER JOINT UNIT

(75) Inventors: Toshihiro Hirabayashi, Azumino (JP); Masashi Horiuchi, Azumino (JP); Hirokazu Ohta, Toyota (JP); Morihiko Ohkura, Toyota (JP)

(73) Assignees: Harmonic Drive Systems Inc., Shinagawa-ku, Tokyo (JP); Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 338 days.

(21) Appl. No.: 12/089,693

(22) PCT Filed: Nov. 30, 2006

(86) PCT No.: PCT/JP2006/323894

§ 371 (c)(1),
(2), (4) Date: Apr. 9, 2008

(87) PCT Pub. No.: WO2007/077698

PCT Pub. Date: Jul. 12, 2007

(65) Prior Publication Data

US 2009/0145254 A1   Jun. 11, 2009

(30) Foreign Application Priority Data

Dec. 28, 2005   (JP) ............................. 2005-379772

(51) Int. Cl.
*F16H 1/16* (2006.01)
(52) U.S. Cl. ...................................... 74/425
(58) Field of Classification Search ............... 74/89, 74/89.14, 412 R, 416, 421 A, 425, 606 R; 294/106

See application file for complete search history.

(56) References Cited

U.S. PATENT DOCUMENTS 4,547,121 A   10/1985   Nesmith (Continued)

FOREIGN PATENT DOCUMENTS

JP   54-125974 U   9/1979

(Continued)

OTHER PUBLICATIONS

Supplementary European Search Report in corresponding application No. 06833697.3-2316 dated Jan. 7, 2009.

(Continued)

*Primary Examiner*—Vicky A Johnson
(74) *Attorney, Agent, or Firm*—Buchanan Ingersoll & Rooney PC

(57) ABSTRACT

A sealed worm gear type finger joint unit for a robot hand has a circular opening in a gear box case of the unit, and the opening is closed by a rubber bush. When the rubber bush is removed, a shaft end face of a worm shaft section is exposed from the circular opening, and this makes a tool engagement section formed on the shaft end face is accessible from the outside. A tool for turning the worm shaft section is fitted in the tool engagement section, and the worm shaft section can be easily turned by the tool. Turning the worm shaft section turns a worm, turning a worm wheel meshing with the worm, and this turns the joint shaft. As a result, a swing arm connected to shaft end sections of the joint shaft can be moved to a predetermined position. In the finger joint unit, the joint shaft can be easily manually turned.

8 Claims, 4 Drawing Sheets

SECTION A-A

U.S. PATENT DOCUMENTS

| | | | |
|---|---|---|---|
| 4,813,303 A | 3/1989 | Beezer et al. | |
| 5,056,213 A * | 10/1991 | Behnke et al. | 29/596 |
| 6,032,550 A | 3/2000 | Rugh | |
| 6,550,567 B2 | 4/2003 | Murakami et al. | |
| 7,243,569 B2 * | 7/2007 | Takahashi et al. | 74/388 PS |
| 2001/0040067 A1 | 11/2001 | Murakami et al. | |
| 2004/0103740 A1 | 6/2004 | Townsend et al. | |
| 2009/0114054 A1 * | 5/2009 | Horiuchi et al. | 74/490.05 |

FOREIGN PATENT DOCUMENTS

| | | |
|---|---|---|
| JP | 2-68656 U | 5/1990 |
| JP | 5-61555 U | 8/1993 |
| JP | 5-192890 A | 8/1993 |
| JP | 2000-39057 A | 2/2000 |
| JP | 2000-120845 A | 4/2000 |
| JP | 2001-315653 A | 11/2001 |
| JP | 2004-224280 A | 8/2004 |
| JP | 2005-14156 A | 1/2005 |
| JP | 2005-344853 A | 12/2005 |

OTHER PUBLICATIONS

International Search Report (PCT/ISA/210).

Chinese Office Action dated Jul. 10, 2009 issued corresponding Application No. 2006800421451.

* cited by examiner

SECTION A-A

SECTION B-B

SEALED WORM GEAR TYPE FINGER JOINT UNIT

TECHNICAL FIELD

The present invention relates to a finger joint unit for a robot hand, and particularly relates to a sealed worm gear type finger joint unit wherein a joint section is configured using a worm gear.

BACKGROUND ART

Known finger joint units for robot hands include those that use worm gears. A worm gear type finger joint unit has a rotary actuator, a worm coaxially fixed to a worm shaft that is rotatably driven by the rotary actuator, a worm wheel that is meshed with the worm, and a joint shaft to which the worm wheel is coaxially fixed. Swing arms (finger main body sections or fingertip sections) are attached to shaft end sections of the joint shaft in a perpendicular state, and the rotation of the joint shaft causes the swing arms to swing.

In a worm gear type finger joint unit of this configuration, when foreign objects enter the bearing sections of the joint shaft and the section where the worm meshes with the worm wheel, this hinders smooth rotation and reduces the longevity of these sections. In cases in which the finger joint unit is used inside a clean room, there is a possibility that a lubricant coated on or supplied to these sections will scatter outward and compromise the cleanliness of the room. To avoid this type of negative result, it is preferable to use a configuration in which the worm, the worm wheel, the joint shaft, and other such components are sealed within a gearbox case.

In the case of a worm gear type finger joint unit, a self-locking mechanism is provided so that the worm cannot be rotated in reverse by the worm wheel. This is useful as a reverse rotation prevention mechanism, but during severe problems such as when the rotary actuator is disabled, the swing arms cannot be moved from the output side, which makes this mechanism inconvenient. Particularly, in the case of a sealed worm gear type finger joint unit, since the worm is housed within the gearbox case, the gearbox case must be disassembled in order to turn the worm manually, which is extremely inconvenient.

If the meshing of the worm gear has backlash, this is amplified by the swing arms attached in a perpendicular state to the joint shaft, and the movement of the swing arms has considerable backlash. In the case of a sealed worm gear type finger joint unit, the worm gear must be incorporated inside a sealed gearbox case. Therefore, it is generally difficult to precisely incorporate the worm gear without any backlash or with minimal backlash.

DISCLOSURE OF THE INVENTION

In view of these problems, an object of the present invention is to provide a sealed worm gear type finger joint unit wherein the joint shaft can be turned simply by a manual operation.

Another object of the present invention is to provide a sealed worm gear type finger joint unit wherein the worm gear can be incorporated simply without any backlash.

To achieve these objects, the sealed worm gear type finger joint unit of the present invention is characterized in having a worm, a rotary actuator for rotatably driving a worm shaft of the worm, a worm wheel that meshes with the worm, a joint shaft that protrudes coaxially from the worm wheel, and a gearbox case in which the worm, the worm shaft, the worm wheel, and the joint shaft are housed; wherein at least one shaft end section of the joint shaft protrudes outward from the gearbox case, a tool engagement section for engaging a tool for turning the worm shaft is formed in a shaft end section of the worm shaft, an opening that makes the tool engagement section accessible from the outside is formed in the gearbox case, and the opening is sealed by a removable lid.

In the sealed worm gear type finger joint unit of the present invention, the opening is formed in the gearbox case and, when the lid that seals the opening is removed, the tool engagement section formed in the shaft end section of the worm shaft can be accessed from the outside. As a result, a tool for turning the worm shaft can be engaged with the tool engagement section from the outside via the opening, and the tool can be operated to turn the worm shaft. Therefore, since the joint shaft on the output side can be turned even in cases such as when the rotary actuator is disabled, the swing arms attached to the joint shaft can be moved simply to a specific position.

The tool engagement section herein can be a groove, a polygonal concavity, or another such tool insertion groove of a specific depth formed in the end face of the shaft end section.

The rotating shaft of the rotary actuator can also be used as the worm shaft. Specifically, the worm shaft can be a worm shaft section in which a rotating shaft of the rotary actuator is increased in length and extended through a shaft hole in the worm, and the shaft end section of the worm shaft in which the tool engagement section is formed can be a shaft end section at the distal end of the rotating shaft. In this case, for example, the external peripheral face of the shaft end section of the worm shaft section of the rotary actuator can be threaded, and the worm can be fixed in place by a nut and key.

In this case, a configuration can be used in which a mounting opening that is sealed by mounting the distal end of the rotary actuator is formed in a region of the gearbox case on the opposite side of the opening, and the shaft end section at the distal end of the rotating shaft of the rotary actuator is rotatably supported by a bearing mounted in the internal peripheral face section of the opening.

In this case, a configuration can be used comprising a first case section in which the worm and the worm shaft section are attached, and a second case section in which the worm wheel and the joint shaft are attached; wherein an exposed face in which the external peripheral face of the worm is exposed in the first case section, and an exposed face in which the external peripheral face of the worm wheel is exposed in the second case section, lie on both sides of a shim plate and are joined together, whereby the gearbox case is assembled; and a center distance between the worm shaft section and the joint shaft is adjusted by the shim plate.

In the sealed worm gear type finger joint unit having this configuration, the gearbox case is divided in two, the worm shaft section is incorporated into one case section, the joint shaft is incorporated into the other case section, and the shim plate is sandwiched between the case sections, whereby the center distance between the worm shaft section and the joint shaft is adjusted. The simple operation of sandwiching a suitable shim plate makes it possible to incorporate these components with precision inside a gearbox case so that the worm and the worm wheel are meshed together without any backlash, or so that they are meshed together in a manner that minimizes the amount of backlash.

It is preferable that positioning sections that have complementary shapes be formed in the exposed faces of the first case section and the second case section, so that the operation of assembling the two case sections can be performed in a simple manner.

A mounting opening that is sealed by mounting the distal end of the rotary actuator can be formed in a region of the first case section on the opposite side of the opening, the shaft end section of the rotating shaft of the rotary actuator at the distal end of the worm shaft section can be rotatably supported by a bearing mounted in the internal peripheral face section of the opening, and one of the sides of the first case section that are perpendicular to the worm shaft section can constitute the exposed face.

In the sealed worm gear type finger joint unit of the present invention, a tool for turning the worm shaft can be engaged with the tool engagement section from the outside via the opening, and the tool can be operated to turn the worm shaft. Therefore, since the joint shaft on the output side can be turned even in cases such as when the rotary actuator is disabled, the swing arms attached to the joint shaft can be moved simply to a specific position.

In the sealed worm gear type finger joint unit of the present invention, the gearbox case is divided in two, the worm shaft section is incorporated into one case section, the joint shaft is incorporated into the other case section, and the shim plate is sandwiched between the case sections, whereby the center distance between the worm shaft section and the joint shaft is adjusted. The simple operation of sandwiching a suitable shim plate makes it possible to incorporate these components with precision inside a gearbox case so that the worm and the worm wheel are meshed together without any backlash, or so that they are meshed together in a manner that minimizes the amount of backlash.

BEST MODE FOR CARRYING OUT THE INVENTION

The following is a description, made with reference to the drawings, of a sealed worm gear type finger joint unit for a robot hand to which the present invention is applied.

Figure 1:
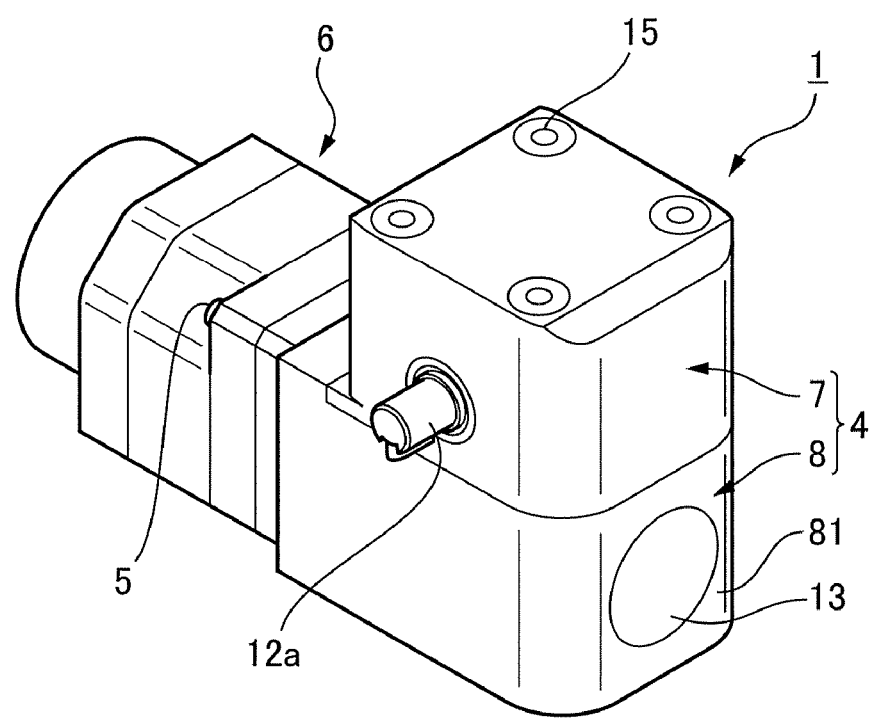
FIG. 1 is an external perspective view of the worm gear type finger joint unit to which the present invention is applied.
Figure 2:
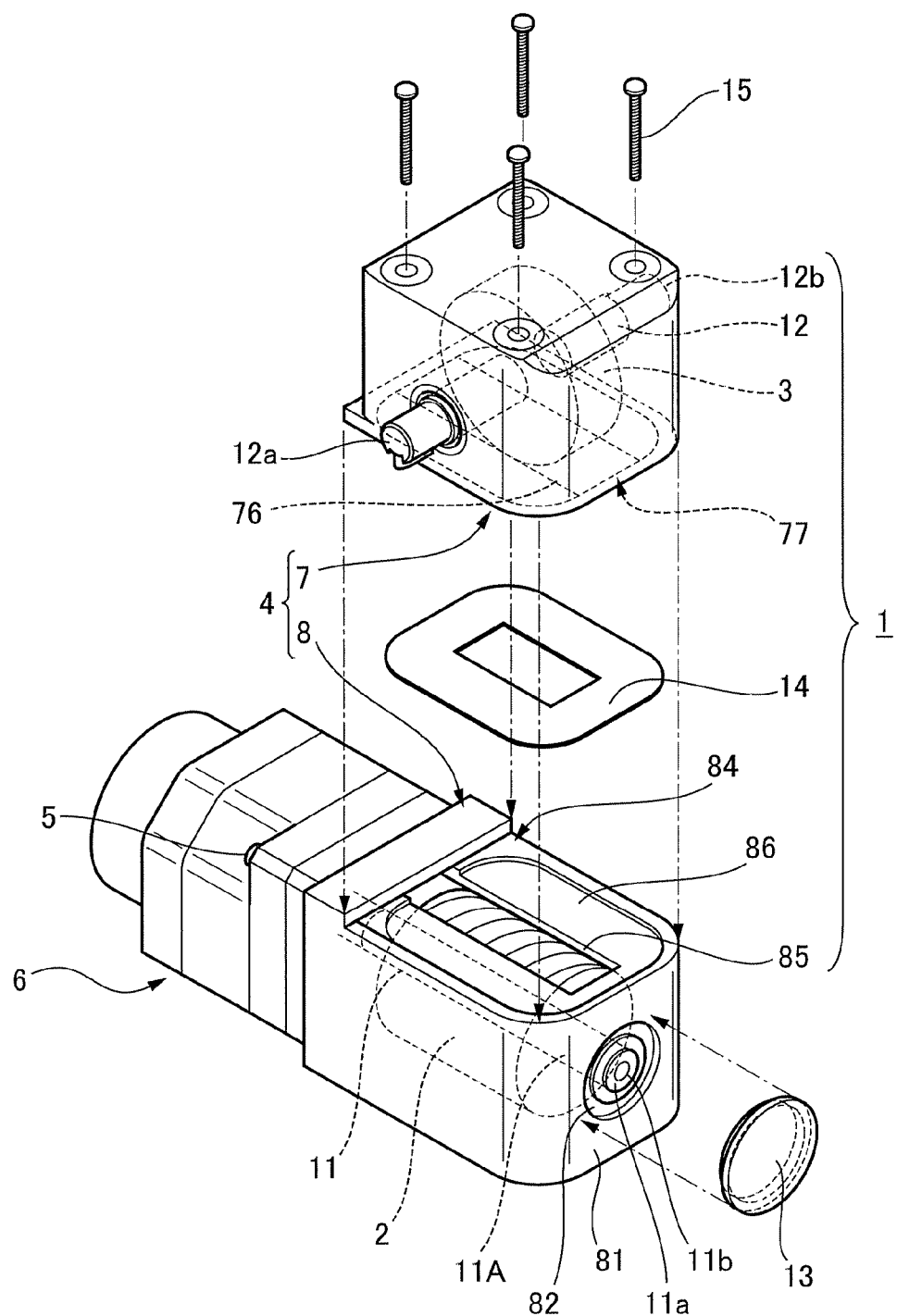
FIG. 2 is an exploded perspective view showing an exploded view of the main section of the worm gear type finger joint unit in FIG. 1.

FIG. 1 is an external perspective view showing the sealed worm gear type finger joint unit of the present example, and FIG. 2 is an exploded perspective view showing an exploded view of the main section thereof. The primary configuration of a worm gear type finger joint unit 1 will be described with reference to these drawings. The worm gear type finger joint unit 1 comprises a gearbox case 4 that houses a worm 2 and a worm wheel 3, and a rotary actuator 6 fastened in place on the gearbox case 4 by two fastening screws 5. The gearbox case 4 is configured from an upper case section 7 and a lower case section 8, which are divided vertically in two.

The lower case section 8 houses a worm shaft section 11A formed integrally with a rotating shaft 11 of the rotary actuator 6, and the worm 2, which is coaxially fixed to the worm shaft section 11A.

The upper case section 7 houses the worm wheel 3, which meshes with the worm 2, and a joint shaft 12 to which the worm wheel 3 is coaxially fixed. Shaft end sections 12a, 12b at either side of the joint shaft 12 protrude outward from either side of the upper case section 7. Attached to these shaft end sections 12a, 12b are swing arms (not shown) that function as finger main body sections, fingertip sections, or the like extending in a direction perpendicular to the joint shaft 12.

A circular opening 82 is formed in a front plate section 81 of the lower case section 8, and this circular opening 82 is sealed by a disc-shaped rubber bush 13 (lid member) that is attached to the circular opening 82 in a removable state. When the rubber bush 13 is removed, a shaft end face 11a of the worm shaft section 11A of the rotating shaft 11 is exposed through the circular opening 82. A tool engagement section 11b that can engage a tool (not shown) for turning the rotating shaft 11 is formed in the shaft end face 11a. In the present example, a tool insertion groove is formed in the form of a hexagon socket of a specific depth. A slot, a cross-shaped groove, or the like may be formed instead of a hexagon socket. The tool engagement section 11b may also be a protuberance formed in the shaft end face 11a. The rotating shaft 11 can be turned in a simple manner by inserting the tool into the tool engagement section 11b of the shaft end face 11a.

The lower case section 8 and the upper case section 7 lie on both sides of a rectangular frame-shaped shim plate 14 and are fastened together by four fastening bolts 15. The center distance between the worm shaft section 11A of the rotating shaft 11 housed in the lower case section 8, and the joint shaft 12 (worm wheel shaft) housed in the upper case section 7, is adjusted by the shim plate 14. Therefore, with the lower case section 8 and the upper case section 7 assembled together, a state can be formed in which the worm 2 on the bottom and the worm wheel 3 on the top are meshed together without any backlash.

Figure 3A:
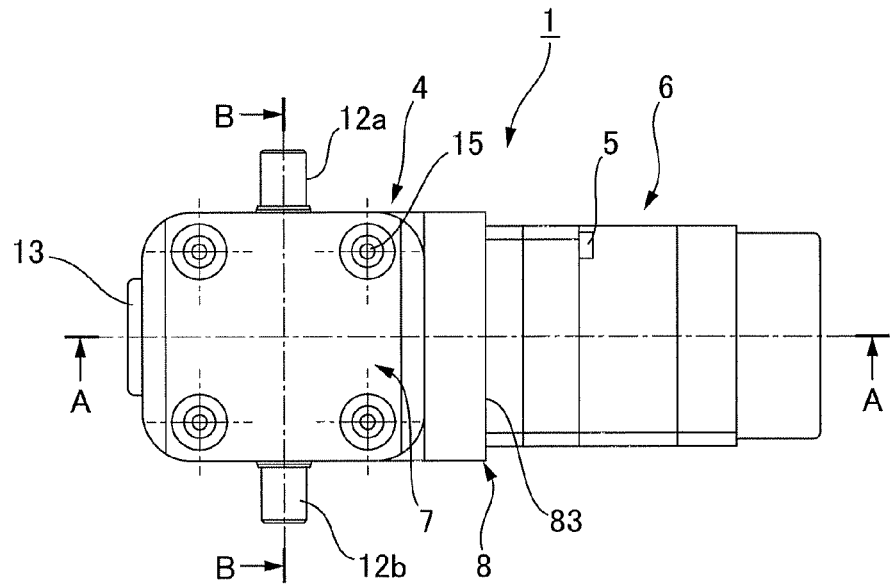
FIG. 3A is a plan view of the worm gear type finger joint unit in FIG. 1.
Figure 3B:
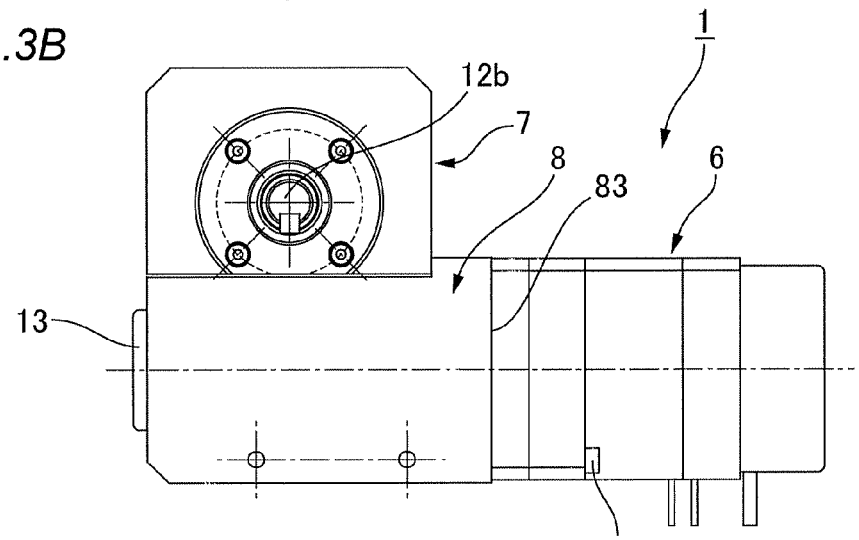
FIG. 3B is a side view of the worm gear type finger joint unit in FIG. 1.
Figure 3C:
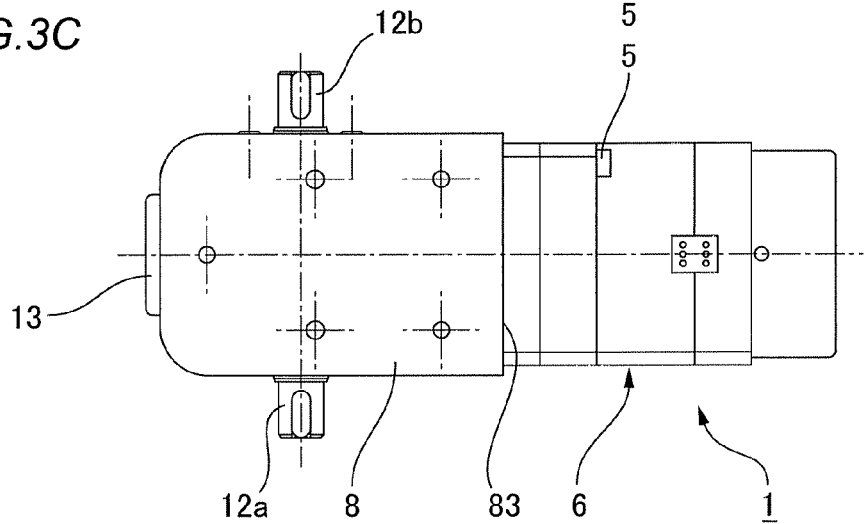
FIG. 3C is a bottom view of the worm gear type finger joint unit in FIG. 1.
Figure 4A:
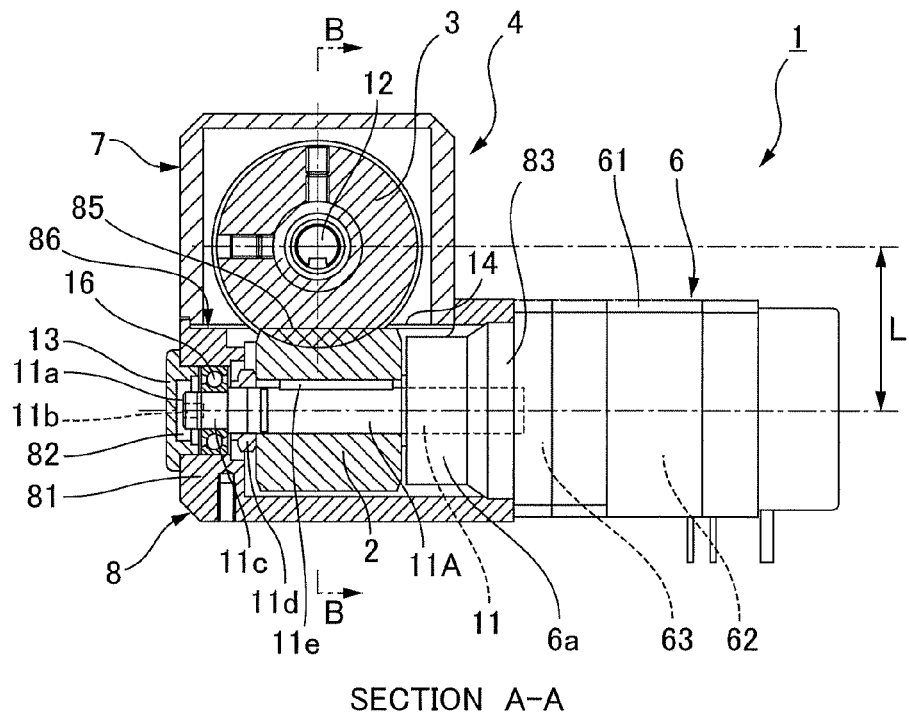
FIG. 4A is a longitudinal cross-sectional view of the worm gear type finger joint unit in FIG. 1.
Figure 4B:
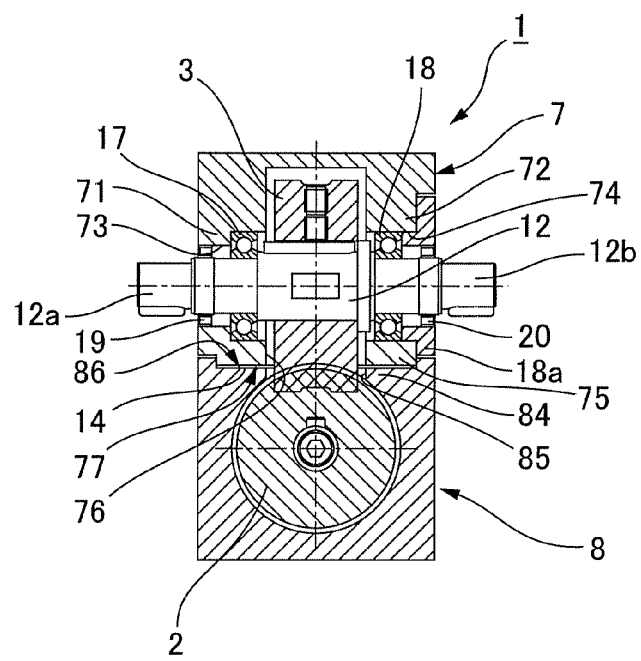
FIG. 4B is a transverse cross-sectional view of the worm gear type finger joint unit in FIG. 1.

FIGS. 3A, 3B, and 3C are, respectively, a plan view, a side view, and a bottom view of the worm gear type finger joint unit 1. FIGS. 4A and 4B are a longitudinal cross-sectional view and a transverse cross-sectional view of the worm gear type finger joint unit 1. The structure of the parts of the worm gear type finger joint unit 1 will be described in detail with reference to these drawings.

First, the lower case section 8 of the gearbox case 4 has the shape of a rectangular parallelepiped whose length runs front to back, and the rear end section thereof constitutes an opening 83. Here a distal end 6a of the rotary actuator 6 is inserted through the rear side. The rotary actuator 6 has a cylindrical housing 61, as well as a motor 62 and reducer 63 housed within the housing 61. The distal end section of the rotating shaft 11, which is the reducer output shaft, extends through a shaft hole in the worm 2, and this section constitutes the worm shaft section 11A. The shaft end of the worm shaft section 11A of the rotating shaft 11 is threaded, and the worm 2 is fixed in place to the worm shaft section 11A by a nut 11d and key 11e.

A shaft end section 11c at the distal end of the worm shaft section 11A is concentrically inserted into the circular opening 82 formed in the front plate section 81 of the lower case section 8, and is rotatably supported by a bearing 16 mounted on the inner side of the circular opening 82. The shaft end face 11a of the worm shaft section 11A where the tool engagement section 11b is formed is in substantially the same position as the surface of the front plate section 81, and is covered by the rubber bush 13 attached to the circular opening 82.

The external peripheral face of the worm 2 fixed to the worm shaft section 11A is exposed at the top through a longitudinally extending oblong opening 85 formed in a top surface section 84 of the lower case section 8. A rectangular frame-shaped ridge 86 used for positioning is formed so as to enclose the opening 85. The shim plate 14 has a rectangular frame shape of a size that fits within the rectangular frame-shaped ridge 86.

In the upper case section 7, the joint shaft 12 extends between left and right side plate sections 71, 72, and both of the end sections of the joint shaft 12 are rotatably supported by bearings 17, 18 mounted in shaft holes 73, 74 formed in the side plate sections 71, 72. The bearing 18 is fixed in place from the outside by a toric worm wheel 18a. Both of the shaft end sections 12a, 12b of the joint shaft 12 protrude to the outside from the side plate sections 71, 72. The gaps between the shaft end sections 12a, 12b and the shaft holes 73, 74 are sealed from the outside by oil seals 19, 20.

An oblong opening 76 is formed in the bottom plate section 75 of the upper case section 7, and the underside of the worm wheel 3 coaxially fixed to the joint shaft 12 is exposed through this opening 76. In the present example, the underside of the worm wheel 3 is meshed with the lower worm 2 via the opening 76 and the opening 85 in the lower case section 8.

A rectangular frame-shaped ridge 77 is formed in the bottom face of the bottom plate section 75 of the upper case section 7 so as to enclose the opening 76, and this rectangular frame-shaped ridge 77 has a shape complementary to the rectangular frame-shaped ridge 86 used for positioning the lower case section 8. Therefore, the rectangular frame-shaped ridge 77 formed in the bottom face of the upper case section 7 is fitted from above into the rectangular frame-shaped ridge 86 formed in the top surface section 84 of the lower case section 8, whereby the two case sections are positioned together.

The rectangular frame-shaped shim plate 14 is sandwiched between these rectangular frame-shaped ridges 86, 77, as previously described. The center distance L between the worm shaft section 11A and the joint shaft 12 (worm wheel shaft) is adjusted by the shim plate 14, as shown in FIG. 4A.

In the sealed worm gear type finger joint unit 1 thus configured, it is possible to simply perform the operation of positioning the swing arms (not shown), which are connected to the shaft end sections 12a, 12b of the joint shaft 12, at specific swing positions, without drivably controlling the rotary actuator 6 on the input side.

Specifically, when the rubber bush 13 attached to the front plate section 81 of the lower case section 8 is removed, the shaft end face 11a of the worm shaft section 11A is exposed through the circular opening 82. Therefore, the tool engagement section 11b formed therein is accessible from the outside. When the tip of the tool (not shown) for turning the rotating shaft 11 is inserted into the tool engagement section 11b and the rotating shaft 11 is turned by this tool, the worm wheel 3 on the output side can be turned. As a result, the joint shaft 12 coaxially fixed thereto also turns, and the swing arms connected to the joint shaft 12 can be swung and positioned.

In the present example, the gearbox case 4 is divided vertically in two; the worm 2 on the input side and the worm shaft section 11A at the distal end of the rotating shaft 11 are incorporated within the lower case section 8; and the worm wheel 3 on the output side and the joint shaft 12 (worm wheel shaft) are assembled within the upper case section 7. Therefore, when the lower case section 8 and the upper case section 7 are assembled together, the shim plate 14 is sandwiched therebetween, whereby the center distance between the worm shaft section 11A and the joint shaft 12 can be adjusted in a simple manner. Consequently, it is possible to simply perform the operation of incorporating the worm 2 and the worm wheel 3 inside the gearbox case 4 in a meshed state free of backlash, or in a meshed state in which the amount of backlash can be adjusted to a minimum.

Furthermore, in the present example, the rectangular frame-shaped ridges 77, 86 that have complementary shapes and that are used for positioning are formed on the surfaces where the upper case section 7 and lower case section 8 are assembled together. When the case sections are assembled, the two rectangular frame-shaped ridges 77, 86 are fitted together, whereby the case sections are automatically positioned relative to each other. Consequently, the operation of assembling the case sections can be performed in a simple manner.

In the present example, the shaft section at the distal end of the rotating shaft 11 of the rotary actuator 6 is used as the worm shaft section 11A. Common worm gears have a configuration in which a cylindrical boss is integrally formed at the end face, and the distal end of the rotating shaft of the rotary actuator is fixed in place in the boss by a locking screw. In cases in which a large radial force is used, either a shaft is attached at the distal end of the worm gear, or a type of worm gear provided with a shaft at the distal end is used, thereby supporting the worm gear at both ends. In the present example, the worm 2 is fixed in place on the worm shaft section 11A formed by extending the rotating shaft 11, and the shaft end section that protrudes from the worm 2 is supported by the bearing 16. Therefore, since the boss section for fixing the worm in place on the rotating shaft can be omitted, the axial length of the worm can be reduced, and a large radial force can be received. Furthermore, the operation of assembling the worm 2 can be simplified.

The invention claimed is:

1. A sealed worm gear finger joint unit, comprising:
   a worm;
   a rotary actuator for rotatably driving a worm shaft of the worm, the worm shaft is a worm shaft section which is formed by extending a rotating shaft of the rotary actuator so as to pass through a shaft hole in the worm;
   a worm wheel that meshes with the worm;
   a joint shaft that protrudes coaxially from the worm wheel; and
   a gearbox case in which the worm, the worm shaft, the worm wheel, and the joint shaft are housed, wherein at least one shaft end section of the joint shaft protrudes outward from the gearbox case;
   a tool engagement section for engaging a tool for turning the worm shaft is formed in a shaft end section of the worm shaft, the shaft end section of the worm shaft in which the tool engagement section is formed is a shaft end section at the distal end of the rotating shaft;
   an opening that makes the tool engagement section accessible from the outside is formed in the gearbox case, the opening being sealable by a removable lid;
   a first case section in which the worm and the worm shaft section are attached; and
   a second case section in which the worm wheel and the joint shaft are attached, wherein
      an exposed face in which the external peripheral face of the worm is exposed in the first case section, and an exposed face in which the external peripheral face of the worm wheel is exposed in the second case section, lie on both sides of a shim plate and are joined together, whereby the gearbox case is assembled, and a center distance between the worm shaft section and the joint shaft is adjusted by the shim plate.

2. The sealed worm gear type finger joint unit according to claim 1, wherein positioning sections that have complementary shapes are formed in the exposed faces of the first case section and the second case section.

3. The worm gear type finger joint unit according to claim 2, wherein a mounting opening that is sealed by mounting a distal end of the rotary actuator is formed in a region of the first case section on the opposite side of the opening;

the shaft end section at the distal end of the rotating shaft is rotatably supported by a bearing mounted in an internal peripheral face section of the opening; and one of the sides of the first case section that are perpendicular to the worm shaft section constitutes the exposed face.

4. The worm gear type finger joint unit according to claim 3, wherein the tool engagement section is a groove or a polygonal concavity of a specific depth formed in an end face of the shaft end section.

5. The worm gear type finger joint unit according to claim 2, wherein the tool engagement section is a groove or a polygonal concavity of a specific depth formed in an end face of the shaft end section.

6. The worm gear type finger joint unit according to claim 1, wherein a mounting opening that is sealed by mounting a distal end of the rotary actuator is formed in a region of the first case section on the opposite side of the opening;

the shaft end section at the distal end of the rotating shaft is rotatably supported by a bearing mounted in an internal peripheral face section of the opening; and one of the sides of the first case section that are perpendicular to the worm shaft section constitutes the exposed face.

7. The worm gear type finger joint unit according to claim 6, wherein the tool engagement section is a groove or a polygonal concavity of a specific depth formed in an end face of the shaft end section.

8. The worm gear type finger joint unit according to claim 1, wherein the tool engagement section is a groove or a polygonal concavity of a specific depth formed in an end face of the shaft end section.

\* \* \* \* \*